CLOCK FOR OVERLAPPED MEMORIES MITH ERROR CORRECTION

Filed July 15, 1968 2 Sheets-Sheet 1

INVENTOR
CORNELIUS J. ENRIGHT, JR.

BY W. Robertson

ATTORNEY

Feb. 2, 1971 C. J. ENRIGHT, JR 3,560,942

CLOCK FOR OVERLAPPED MEMORIES MITH ERROR CORRECTION

Filed July 15, 1968 2 Sheets-Sheet 2

United States Patent Office 3,560,942

Patented Feb. 2, 1971

3,560,942

CLOCK FOR OVERLAPPED MEMORIES WITH ERROR CORRECTION

Cornelius J. Enright, Jr., La Grangeville, N.Y., assignor to International Business Machines Corporation, Armonk, N.Y., a corporation of New York Filed July 15, 1968, Ser. No. 745,010
Int. Cl. G11c 7/00
U.S. Cl. 340—173 7 Claims

ABSTRACT OF THE DISCLOSURE

This disclosure teaches a clock circuit that can be shared by several memories. The clock controls the memories to operate in an overlapping mode and to share error correction circuitry and other common circuits.

INTRODUCTION

It will be helpful to review the general features of memories and memory timing circuits that apply to this invention. A memory stores data in units called words. In a read-write cycle, an addressed word is first read from the memory and is available to be transmitted to the system associated with the memory. The read operation also clears the addressed word location of its previous data to prepare for the forthcoming write portion of the cycle. This word is then rewritten in to the same location or a new word is written into this location. The associated system may operate on portions of a word that are called bytes. For example, a memory may have a word length of 72 bits that provides 8 bytes of 9 bits each.

Each memory has a timing circuit called a clock that provides a preset sequence of timing signals to the circuits that operate the memory through the read-write cycle. The associated system provides the memory with the address of the word location where the read-write operation is to take place, data to be written into the addressed location, and a signal called "select" that starts the memory clock. The system also provides signals that designate particular byte locations that are to receive new data; these signals are called mark bits and they are stored in a mark register.

In the system associated with the memory, each byte of data commonly includes a parity bit from which parity check circuits can detect errors in any single bit location. Such an error is called a single error, and simple parity check circuits cannot detect double errors or higher order errors. In the example of the 9 bit byte, a byte includes eight data bits and one parity bit; thus a word includes 64 data bits and 8 parity bits. Within the memory it is advantageous to use the eight parity positions to store a pattern of bits for correcting single errors (which can be detected but not corrected with a simple parity check) and for detecting double errors. One object of this invention is to provide a new and improved clock circuit for a memory using an error correction circuit.

When the function of a read-write cycle is only to provide data from the memory to the associated system, the operation is called a fetch. In a fetch operation on a memory using error correction, the word of data is read from the memory in its error correction form, it is checked for errors and any single errors are corrected, and it is transmitted to the associated system. The subsequent write operation restores the original or corrected word to the same location in the memory. In a store operation, the associated system supplies a word to be written in the memory along with a parity bit for each byte of the word. The data bits are encoded to form error correction bits and the data bits and error correction bits are stored in the addressed location of the memory. A partial store operation occurs when the mark register identifies byte locations that are to receive new data and byte locations that are to retain their original data. The circuitry for the fetch operation already described receives a full word from the memory and checks the word for errors. The circuits for the store operation already described receive bytes from the system and the bytes from the fetch circuit that are to be retained, and the store circuits form a new set of error correction bits for the forthcoming write portion of the memory cycle. Errors that are found in the bytes that are to be retained are corrected. In such a memory, the conventional read-write cycle may be lengthened by the time required between the read portion and the write portion to make the corrections.

Because the memory operates independently of the system during most of its operating cycle, it is advantageous to overlap the operations of several memories such that one memory can receive data from the system or supply data to the system while other memories are independently operating in portions of their read-write cycles that do not involve the associated system. An object of this invention is to provide a new and improved clock for providing timing signals for operating memories in an overlapped mode to share error correction circuits or other common circuits. The problems in achieving this general object and more specific problems will be described in the following description of the invention and a later description of circuit and other components. FIGS. 2 and 3 show the clock of this invention.

THE INVENTION

This invention includes a clock circuit that provides a preset pattern of pulses for timing certain operations of each memory and for timing the circuits that are common to the memories. For example, the clock provides the select signal that starts the clock of an individual memory. The timing circuit is started in response to a select signal addressed to any one the memories, and it is arranged to provide timing for two or more memories that are operating at different phases of their memory cycle. The system using the memory is conventionally arranged to provide selects at not more than a predetermined minimum time separation. For example, the specific memory has a read-write cycle of about one microsecond and the system operates to select a memory not closer together than about a quarter of a microsecond. Furthermore, the selects are timed to fall at particular times, in the example at intervals of about 80 nanoseconds.

As the invention has been described so far, the clock provides signals to the error correction circuits and other common components without regard to which memory fact has access to the circuits that are being timed. For these circuits the time required to operate on a related group of circuits is made less than the minimum interval between selects. Thus one memory completes its operation on these circuit groups before a second memory begins. Other timing operations are associated with a particular memory and these timing signals cannot simply be provided to all of the memories; for example, when a memory is selected, a latch is set to signal that the memory is not available for other operations with the associated system until the end of a read-write cycle when the latch is reset. Means is provided to assure that such timing signals are directed to only the circuits that are at the corresponding stage of the read-write cycle. Circuits are provided to establish time zones in the clock that are mutually exclusive for the different memories. One time zone, for example, extends throughout the error correction operation. Only one memory at a time can be in a particular time zone to receive the corresponding timing signals. As a memory advances through the read-write cycle, it advances from zone to zone.

For each memory the clock includes a latch for each time zone. The latch for the first time zone is set in response to a select signal which identifies the particular memory. As the timing pulse that is initiated by this select signal advances through the timings for the first zone, corresponding timing pulses are supplied to only the particular memory. While this memory is in the first time zone, other memories operating in other time zones receive appropriate timing signals. As the timing sequence for this memory advances into the second time zone, the latch for the first zone is reset and the latch for the second zone is set. Thus another memory can begin operation in the first time zone without producing timing signals that affect the memory now operating in the second zone.

The circuit described so far provides a fixed sequence of timing signals that are independent of the timing signals of other simultaneously operating memories. Certain operations can advantageously be advanced if, in fact, there is no memory operating in the next time zone. For example, the memory that will be described specifically includes a register that receives data and parity bits from the associated system and holds the data to be transferred into a register of the error correction circuits. It is necessary that data not be transferred from the first register to the second register until the error correction opeations have been completed. On the other hand, it is advantageous to clear the first register so that it can accept data from the associated system. For such an operation, this invention provides either an early timing or a late timing, whichever is appropriate. At a suitably early stage of the operation of the memory, a latch output is sampled to detect whether any other memory is operating just ahead such that the early timing would interfere with the operation of the other memory. If no other memory is in this stage of the read-write cycle, the memory sets its latch to signal that it is taking advantage of the early timing and that any memory coming later in time cannot use the early timing. The latch is also connected to enable the circuits that provide the early timing and to inhibit the circuits that otherwise would provide a late timing pulse. If the operation does not permit the early timing, the memory proceeds through a late timing sequence. At a suitable later time, the memory also sets the latch to prevent other memories from taking over and providing an early timing. Thus certain operations can be shifted ahead or held back depending on the status of other memories and their operating cycles.

The foregoing and other objects, features and advantages of the invention will be apparent from the following more particular description of the preferred embodiment of the invention, as illustrated in the accompanying drawings.

THE DRAWING

Figure 1:
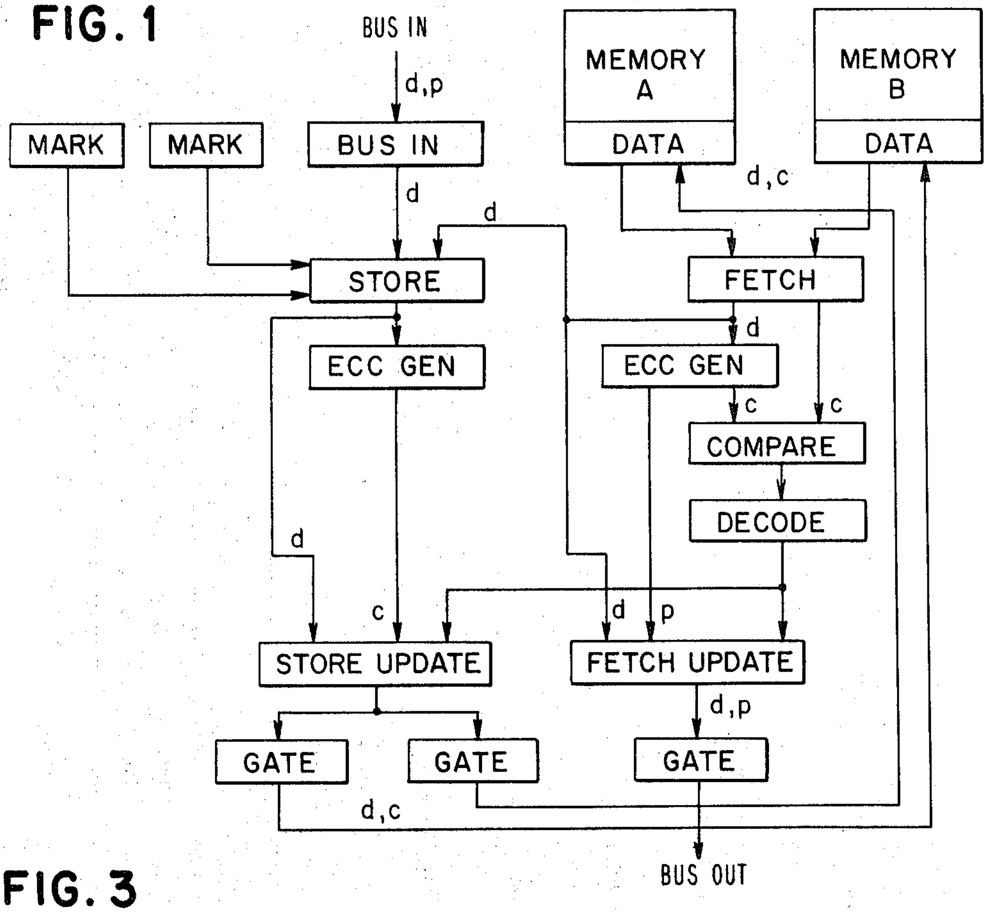
FIG. 1 shows two memories and an error correction circuit shared by the memories.

The memory and circuits of FIG. 1

Figure 3:
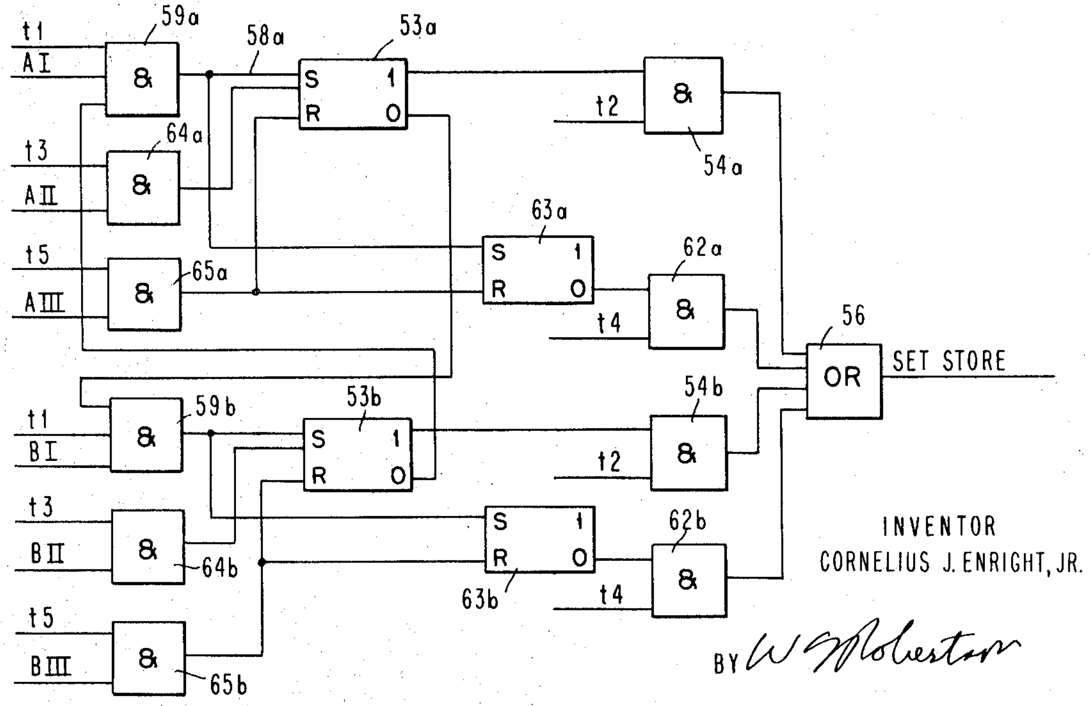
FIGS. 2 and 3 show the preferred embodiment of the clock of this invention.
Figure 2:
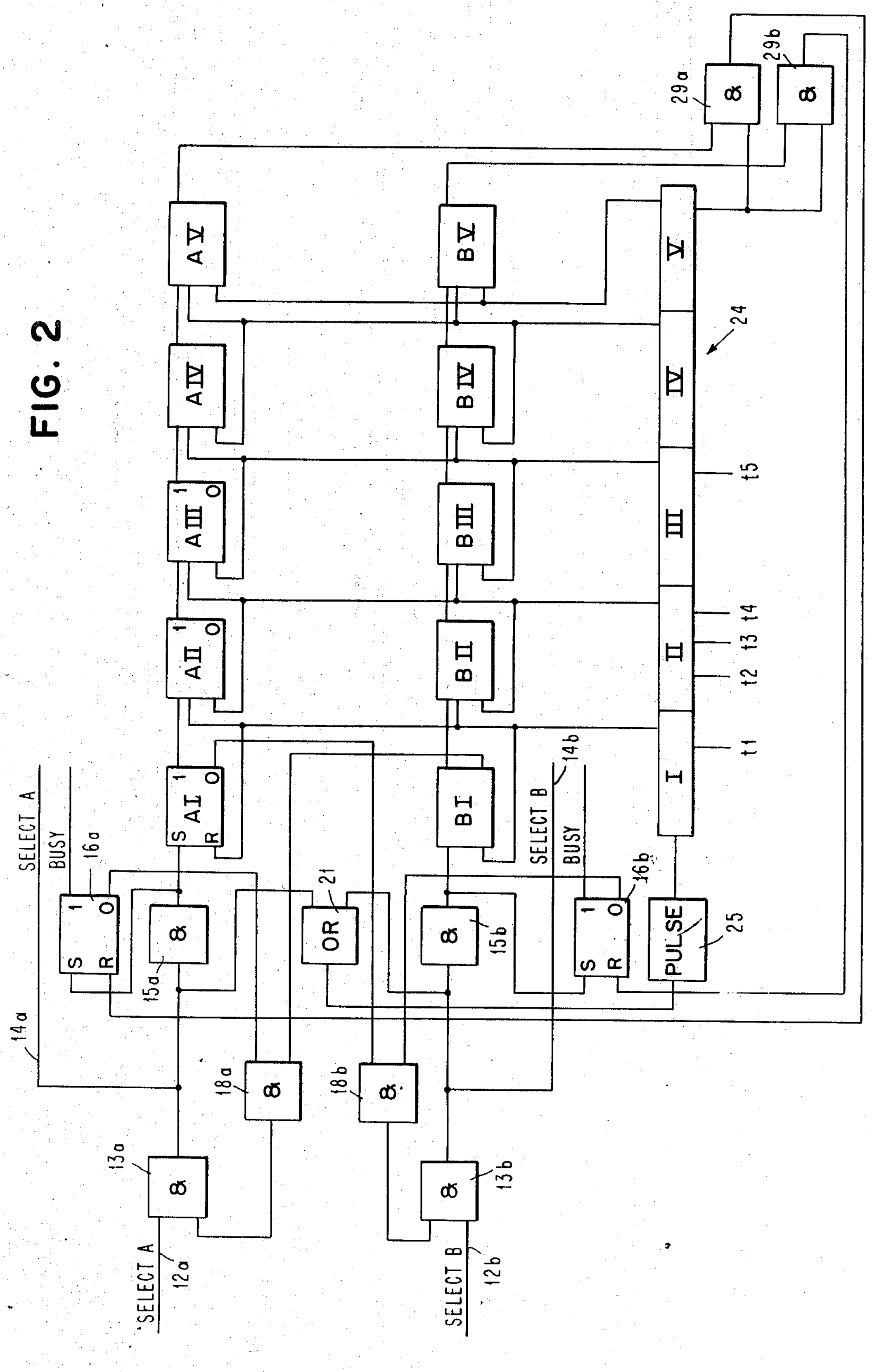

FIG. 1 shows two memories A and B and associated circuits that are controlled by the clock of FIGS. 2 and 3. Each memory includes timing and logic circuits for read and write operations that are started in response to an address and a select signal supplied by the associated system. The drawing shows a data register for each memory (DATA). Data to be stored in the memory appears on one bus (BUS IN) and data read from the memory to be supplied to the system appears on another bus (BUS OUT). The system also supplies mark signals for each memory that are stored in mark registers (MARK). In the drawing the letters, *d*, *c*, and *p*, identify lines in the drawing as transmitting respectively data, error correction bits and parity bits. At the input and output buses, the word is in parity form; in the memory the word is in error correction form. The circuits that transmit the word between the buses and the memories will be described as they appear in the following descriptions of the store, fetch, and partial store operations.

In a store operation, data is transferred from the bus into a register (BUS IN) where circuits not shown in the drawing make a conventional parity check. The data portion of the word is transferred to a second register (STORE). From the store register the data is supplied to a register (STORE UPDATE) and the word appears in both the store and the store update registers during most of the operation of the error correction circuits. The output of the store register is also connected to provide the data portion of the word to a circuit (ECC GEN) that encodes the data bits to form error correction code bits. The errors correction bits are entered into the store update register from the output of the store update register the new data to be stored is transmitted through either of two GATE circuits to the selected memory.

During the operation just described, the memory performs a read operation which functions to clear the addressed word location for the write operation.

In a fetch operation a word in error correction form is transferred from the selected memory to a FETCH register. The data portion of the word in the fetch register is transferred to the store register where it is encoded in the operation already described to be stored in the selected memory in the forthcoming write operation. The data portion of the fetch register is also supplied to an error correction code generator circuit (ECC GEN) and to a FETCH UPDATE register. The error correction code generator supplies parity bits to the fetch update register.

The error correction bit generator also supplies a new set of error correction bits. If the new set of error correction bits matches the error correction bits read from the memory there is no detectable error in the word. Error correction bits from the fetch register and from the error correction code generator are applied to a circuit (COMPARE) that compares the corresponding bits and produces output signals called syndromes. The syndromes are applied to a DECODE circuit that identifies the error bit position in the store update and fetch update registers and outputs from the diode circuit are connected to change appropriate register stages to correct the error. In the store update register the output of the decode circuit corrects a bad bit and also changes the error correction bits to form a new error correction code. In the fetch update register the output of the decode circuit corrects the bad bit and changes the parity bit of the byte in which the error occurred. The word in the fetch update register is then available to be transferred through a gate circuit to the bus out. The decode circuit also provides outputs signaling the occurrence of a single error or a double error. Because the Fetch register does not receive data until near the end of the read operation, data for one operation can be held in the Fetch update register while data for the next operation is entered into the store register.

In a partial store operation the mark register is set to signify that one or more bytes but less than a full word on the BUS IN are to be combined with the remaining bytes of the addressed word to form a new word in the memory. The mark register controls the fetch register to supply to the store register only the bytes that are to be rewritten in the memory. The new word in the store register is then handled in the way already described for the store operation. The fetch circuits operate on the full memory word, as is necessary to detect errors in the bytes that are to be rewritten. Errors that are located in the bytes to be rewritten are corrected in the store update register as has already been explained. Errors that occur in the bytes that are not being rewritten are prevented by the mark register from producing undesirable corrections in the store update register.

To generalize, FIG. 1 illustrates a plurality of memories that are provided with sufficient individual circuits for independent operations during significant portions of their operating cycles. Circuits are provided that are used commonly by the memories for a portion of the memory operating cycle. Certain groups of these circuits cooperate throughout a significant time interval and other circuits are partly dependent on other circuits for their timing.

The circuit of FIG. 2

Many of the components of FIG. 2 are duplicated for the two memories A and B, and these components are identified by the same number with an identifying subscript *a* or *b*. These components will be referred to without subscripts where the descriptions apply generally.

A select signal, introduced in the description of FIG. 1, is received from the associated system on a line 12 and transmitted through an AND circuit 13 to a line 14 that is connected to the selected memory. The output of circuit 13 is also applied through a circuit 15 to the set input of a latch 16. When latch 16 is set, it provides a BUSY signal at its 1 output conventionally signifying that a memory has been selected and is not available for a further selection. Latch 16 is also connected through an AND circuit 18 to inhibit transmission of further selects through circuit 13 while the memory is busy. Latch 16 is connected to be reset at the end of a timing cycle as explained later, to enable the memory to begin another operation.

Latch 16 preferably comprises two AND circuits having their outputs connected to the inputs of an OR Invert circuit. The output of the OR Invert circuit is shown as 0 in the schematic of the latch. The output of the OR Invert circuit is connected through an Invert circuit to form the 1 output. The 1 output is connected to one input of an AND circuit having a second input shown as R (reset) in the schematic. The second AND circuit receives the set input. For some other latches of FIGS. 2 and 3, the second AND circuit requires coincident energization of two inputs for setting the latch, or a third AND circuit provides an OR function of two inputs for setting the latch, as will be explained for particular circuits.

The output of each circuit **13*a*, 13*b* is also connected through a common OR circuit 21 to provide an output to start a timing circuit that will be described next. The output of circuit 21** is also connected through conventional circuits not shown for resetting the Bus In register and then setting the Bus In register to store the word on the Bus In at the beginning of the cycle.

The circuit includes a timing pulse generator that preferably includes a delay line 24 and a pulse forming circuit 25 that is connected to start a pulse on the delay line in response to a signal at the output of the OR circuit 21. The delay line is tapped to provide pulses in a predetermined time sequence. The delay line is functionally divided into five time zones that are identified by Roman numerals I through V. The line may be divided structurally into corresponding segments by circuits that receive the timing pulses at the end of one segment and provide an amplified input to the next segment. The segments may be duplicated in part to provide additional taps and they may be overlapped to provide better timing for related timing pulses that occur in different zones.

As the clock has been described so far, it provides signals that are made to occur at particular times in the operating cycle of the memory that initiated a timing pulse, but without regard to which memory in fact is in the corresponding phase of its operating cycle. The time zones are made slightly less than the interval between selects from the associated system. Thus only one memory can operate in any time zone. The parts of the error correction circuits that are interdependently timed are arranged to operate within a single time zone. Thus timing signals that are taken directly from the delay operate the circuits that are common to both memories.

Many of the error correction circuits receive such signals directly from the delay line. Other timings are intended for circuits that are duplicated for each memory, and means is provided for directing such signals to the appropriate memory.

Means is provided for directing certain timing signals to either memory A or B as appropriate. Each memory is provided with a latch for each time zone. In the drawing the latches are identified by the letter A or B and the numeral of the time zone. The latches are interconnected with the delay line so that only one latch can be set for each time zone and only one latch can be set for each memory. Latch AI has its set input connected to the output of circuit **15*a* to be set at the beginning of a timing cycle for memory A when circuit 15*a* transmits the select signal to set latch 16*a*.** Latch AI has its reset input connected to receive a signal near the end of the first time zone. Thus latch AI is set while memory A is operating in time zone I. Latch AII is connected to be set in response to the coincidence of a timing signal near the end of time zone I and the 1 output of the preceding latch, AI. The input from latch AI assures that latch AII is set only as memory A is entering zone II in its operating cycle. Latches AIII, AIV and AV are similarly interconnected to be set and then reset in sequence as memory A advances through these time zones. The latches for memory B are similarly interconnected and are connected to the same points of the delay as the latches of memory A. Thus, when the clock timing is adjusted for either memory, the correct timings are provided for each memory.

FIG. 2 also shows a typical connection between outputs of the latches and the output of the time delay for selectively timing a particular memory. A circuit **29*a* combines the outputs of latch AV and a timing signal near the end of time zone V to produce an output to reset latch 16*a* at the end of the cycle of memory A. A circuit 29*b* combines the same timing output with an output from latch BV to produce a reset signal for latch 16*b*.** Thus each memory is provided with a timing signal for this function at a corresponding point in its cycle and these signals are directed only to the appropriate memory.

The circuits already described in FIG. 1 are connected to receive appropriate timing pulses from circuits of the type illustrated by AND circuit 29 or directly from the delay line 24. During time zone I the mark registers of the particular memory are set. Time zone I also provides the signal designated TI in the drawing that is applied to the circuit of FIG. 3 to control setting the STORE register. Time zone II provides an input to the circuit of FIG. 3 and inputs to set the store register, to reset and then set a register in the compare circuit that stores the syndromes generated during the compare operation, to set the fetch update and store update registers and then reset the fetch and store registers, to provide a signal to the associated system that the data is forthcoming on the BUS OUT, and to reset the data registers of the memory. Time zone IV typically provides a signal to control a selected gate to transfer information from the fetch update register to the data out bus. Time zone V provides various reset signals as the memory cycle ends. Thus time zones I and II correspond approximately to the read operation of a memory, time zone III corresponds to the error correction operation, and time zones IV and V span the write operation of the memory cycle.

Logic circuit 15, which has been introduced but not explained, provides for an additional input to the circuit. Whenever power fails and then is RESTORED, it is desirable to reset all the latches to their INITIAL states; an input to circuits **15*a*, 15*b* and a similar input to set latches 16** and to set the bus in registers suitably operates the circuits through a full cycle to reset all of the latches. The transmission of data is inhibited during this operation.

As the memory has been described so far the circuit provides a fixed sequence of timing pulses, assures that memories using the clock are sufficiently separately in time, and assures that when several memories are operating simultaneously certain signals are directed only to particular memories. The circuit of FIG. 3 which was introduced in the reference to the timing outputs *t*1 through *t*4 of the delay line 24 selectively advances or retards selected operations of the memory within the cycle of one memory depending on the operating state of any memories in an adjacent time zone.

The circuit of FIG. 3

The circuit of FIG. 3 receives timing signals and outputs from the timing latches of FIG. 2 and produces a signal to set the store register from the BUS IN register. The circuitry for each memory is essentially duplicated and the letter subscripts designate particular memories. Time *t*2 is an early timing pulse that can set the store register only if there is no other memory operating in a closely ahead time zone. Time *t*1 is an earlier time at which the decision is made whether to set the store register at the early time *t*2 or to set it later at time *t*4. Time *t*4 is late enough that the store register can be set without regard to the operation of any other memory. Time *t*5 provides a reset signal. The components will be explained as they appear in the description of selecting the early signal and the operation of selecting the late signal.

A latch 35 has its 1 output connected to control a gate 54 to transmit the timing pulse *t*2 through a circuit 56 that is common to all memories to produce a set store output. Latch 53 is set on the occurrence of either of the inputs at its set input. The set input 58 is provided by a circuit 59 that receives the timing signal *t*1 which occurs in zone I, the output of the zone I latch for a particular memory, and a signal from the latch 53 of every other memory. The latches 53 and AND circuits 59 are interconnected in such a way that only one memory can have its latch 53 set to take advantage of the early timing. For example, if memory B is operating in zone II, its latch 53*b* is set. If memory A is operating in zone I, it cannot be permitted to use the early timing because it would interfere with the operation of memory B. The operation of circuit 59*a* in response to the signals *t*1 and AII would be inhibited by the input from latch 53*b* and latch 53*a* would not be set at the early time in the cycle.

The late timing signal, *t*4, is transmitted through an AND gate 62 that is controlled by a latch 63. Latch 63 is reset at the end of the operation being described and thereby enables gate 62 to provide the late timing signal. Latch 63 is connected to be set in response to an output of the associated AND circuit 59 to prevent the occurrence of both an early and a late signal for the same memory cycle. An AND circuit 64 is connected to receive a timing signal *t*3 that is closely related to timing signal *t*2. Circuit 64 also receives a zone II signal for the associated memory. The output of circuit 64 sets the associated latch 63 to provide outputs inhibiting other memories from using the early timing while a particular memory is using the late timing. A circuit 65 receives inputs to reset latches 53 and 63 at the end of this operation.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In combination with a plurality of memories, and an associated system supplying select signals to individual memories at a predetermined minimum interval that is less than the operating cycle time of a memory, the improvement comprising:

a circuit common to said memories and having interdependently timed components operable during a predetermined portion of a memory cycle for a time that is not significantly greater than said predetermined interval, and timing means connected to be responsive to a select signal for one of said memories to provide timing signals to said common circuit and to provide timing signals exclusively to said one memory.

said timing means including for each memory a plurality of latches each connected to be controlled by said timing means to correspond to a time zone within a memory cycle, and means connecting said latches to provide said exclusive timing signals to the associated memory.

2. In combination with a plurality of memories, an associated system supplying select signals to individual memories at a predetermined minimum interval that is less than the operating cycle time of a memory, and an error correction circuit for all said memories, the improvement comprising:

means for producing a sequence of timing signals for operating a memory and said error correction circuit through a cycle, and means connecting selected of said signals to corresponding components of said error correction circuit, and latches for each memory connected when set to direct predetermined timing signals falling within a corresponding time zone to the components individual to the corresponding memory, and means connecting said timing means to start and a first of said zones to be set in response to a select signal.

3. The improvement according to claim 2 including means selectively to advance or retard certain timing operations according to the operation state of the other of said memories.

4. The improvement according to claim 3 including for a selected timed operation, an early timing and a late timing, means for each memory operable before said late timing to inhibit an early timing pulse to another memory, and means responsive to said means for each other memory before said early timing to provide said early timing.

5. The improvement of claim 2 including means connecting set and reset inputs of said latches to said timing signal means and to outputs of preceding time zone latches to maintain for each operating memory a latch in a set state according to the time zone of the operation of the associated memory.

6. The improvement of claim 5 in which said error correction circuit includes interdependently timed components operable in about said predetermined interval and one of said latches for each memory is connected to define a time zone spanning said interdependently timed operation.

7. The improvement of claim 6 in which said error correction circuit includes independently timed operations outside the time of said interdependently timed operations, including means connecting a latch adjacent in time to said one latch to control said independently timed operation.

References Cited

UNITED STATES PATENTS

| | | | |
|---|---|---|---|
| 2,800,280 | 7/1957 | Haynes | 340—146.1 |
| 2,843,841 | 7/1958 | King | 340—173 |

TERRELL W. FEARS, Primary Examiner

U.S. Cl. X.R.

340—146.1, 172.5